United States Patent [19]

Ueikita

[11] Patent Number: 4,988,570
[45] Date of Patent: * Jan. 29, 1991

[54] PROCESS FOR FORMING A FILM

[75] Inventor: Masakazu Ueikita, Kobe, Japan

[73] Assignee: Kanegafuchi Kagaku Kogyo Kabushiki Kaisha, Tokyo, Japan

[*] Notice: The portion of the term of this patent subsequent to Apr. 18, 2006 has been disclaimed.

[21] Appl. No.: 434,628

[22] Filed: Nov. 9, 1989

Related U.S. Application Data

[60] Continuation of Ser. No. 267,593, Nov. 7, 1988, abandoned, which is a division of Ser. No. 905,415, Sep. 10, 1986, Pat. No. 4,801,420.

[51] Int. Cl.$^5$ .......................... B32B 9/04; B05D 1/20
[52] U.S. Cl. ............................... 428/411.1; 427/434.3; 428/473.5
[58] Field of Search .................. 427/434.3; 428/411.1, 428/473.5

[56] References Cited

U.S. PATENT DOCUMENTS

| | | |
|---|---|---|
| 3,179,634 | 4/1965 | Edwards . |
| 3,312,663 | 4/1967 | Sorenson . |
| 3,326,851 | 6/1967 | Tocker ................................ 260/47 |
| 3,551,383 | 12/1970 | Fang ...................................... 260/47 |
| 4,022,732 | 5/1977 | Schwartz .................... 260/29.6 UR |
| 4,740,396 | 4/1988 | Uekita et al. ...................... 427/434.3 |
| 4,822,853 | 4/1989 | Uekita et al. . |
| 4,839,219 | 6/1989 | Uekita et al. ........................ 428/220 |

FOREIGN PATENT DOCUMENTS

| | | |
|---|---|---|
| 0003071 | 7/1979 | European Pat. Off. |
| 54-14594 | 11/1979 | Japan . |
| 55-3027 | 8/1980 | Japan . |

OTHER PUBLICATIONS

Engel et al; J. Am. Chem. Soc., 1985, 107, pp. 8308–8310.
Suzuki et al, Chemistry Letters, 1986, pp. 395–398.
Kakimoto et al, Chemistry Letters, 1986, pp. 823–826.
Engel et al; "Polymeric Materials Science and Engineering"—Proceedings of the ACS Division of Polymeric Materials, 1986.
Vincett et al, Thin Film Solids, 68, 1980, pp. 135–171.
Winter et al, Thin Film Solids, vol. 134, No. 1–3, Dec. 20, 1985, pp. 49–55.
Tredgold et al, Journal of Physics D: Appl. Phys., vol. 15, No. 6, Jun. 14, 1982; pp. L55–58.

Primary Examiner—Edith Buffalow
Attorney, Agent, or Firm—Armstrong, Nikaido, Marmelstein, Kubovcik & Murray

[57] ABSTRACT

A process for forming a built-up film with high polymers whose film inherently cannot be readily obtained by LB technique comprises modifying the high polymers, and if required, further by cyclizing the product partially or wholly, the produced thin films have extremely excellent heat resistance, good chemical resistance and mechanical characteristics and whose thickness is so small that it is generally hardly attainable, that is, less than 10,000 Å, or if desired, super-thin films of 10 to 1000 Å.

5 Claims, 9 Drawing Sheets

PROCESS FOR FORMING A FILM

This application is a continuation of application Ser. No. 267,593 filed Nov. 7, 1988 now abandoned, which is a division, of application Ser. No. 905,415 filed Sept. 10, 1986 now U.S. Pat. No. 4,801,420.

FIELD OF THE INVENTION

This invention relates to a process for forming a film of high polymer, and more particularly to a process for forming a film of a modified high polymer by the Langmuir-Blodgett process.

BACKGROUND OF THE INVENTION

Already in 1930's it was found out by Langmuir and Blodgett that fatty acids having about 16 to 22 carbon atoms form a monomolecular film on the surface of water and such a film can be built up on a substrate, but it is only within recent years that its technical application began to be investigated.

The outline of the investigation hitherto made has been reviewed in "Kotai Butsuri" (Physics of Solids) 17 (12) 45 (1982), Thin Solid Film 68 No. 1 (1980), ibid, 99 No. 1, 2, 3 (1983), Insoluble monolayers at liquid-gas interface (G. L. Gains, Interscience Publishers, New York, 1966), etc., but the conventional Langmuir-Blodgett films (hereinafter referred to as "LB film") of straight chain saturated carboxylic acids are defective in the points of heat resistance and mechanical strength, and so there is a problem that they can find no practical application as they are.

In order to improve these defects investigations were made on polymerized films of unsaturated fatty acids such as $\omega$-tricosenic acid, $\omega$-heptadecenic acid, or $\alpha$-octadecylacrylic acid; unsaturated esters of fatty acids such as vinyl stearate, octadecyl acrylate; and besides these, diacetylene derivatives, etc., but they can be said to be neither sufficiently heat-resistant nor electrically excellent. As for polymers, it is known that some of the high polymers having hydrophilic groups such as polyacids, polyalcohols, ethyl acrylate, polypeptides, etc. are possessed of a film-forming property, but any sort of modified high polymer suitable for LB materials has not as yet been investigated, and there are no excellent material for the LB film worthy of the name.

On the other hand, as a heat-resistant film there may be mentioned polyimide, but the thickness of the film of this material obtained according to the spin coating process is not less than 1000 Å, and usually not less than 1 micron, so that it is very difficult to produce heat-resistant thin film of a thickness not more than 1000 Å and free from pin holes.

SUMMARY OF THE INVENTION

The object of this invention is to make feasible the film formation by a Langmuir-Blodgett technique, by modifying the high polymers which are inherently difficult to be formed into film according to the Langmuir-Blodgett technique, and to provide high polymer films which have a thickness hitherto never obtained easily by the conventional process along with improved heat resistance, chemical resistance, and mechanical characteristics such as adhesive strength, etc.

According to the present invention, there is provided a process for forming a built-up film by the Langmuir-Blodgett technique with a high polymer which contains linear repeating units composed of the first organic group $R_1$ and the second organic group $R_2$, each being at least divalent and having at least two carbon atoms, and both being connected with each other by a divalent bonding group, and at least one of the hydrocarbon-containing groups $R_3$ and $R_4$ of 10 to 30 carbon atoms, which may have substituent groups, bonded to the repeating units by covalent bonding.

DETAILED DESCRIPTION OF THE INVENTION

Figure 1:
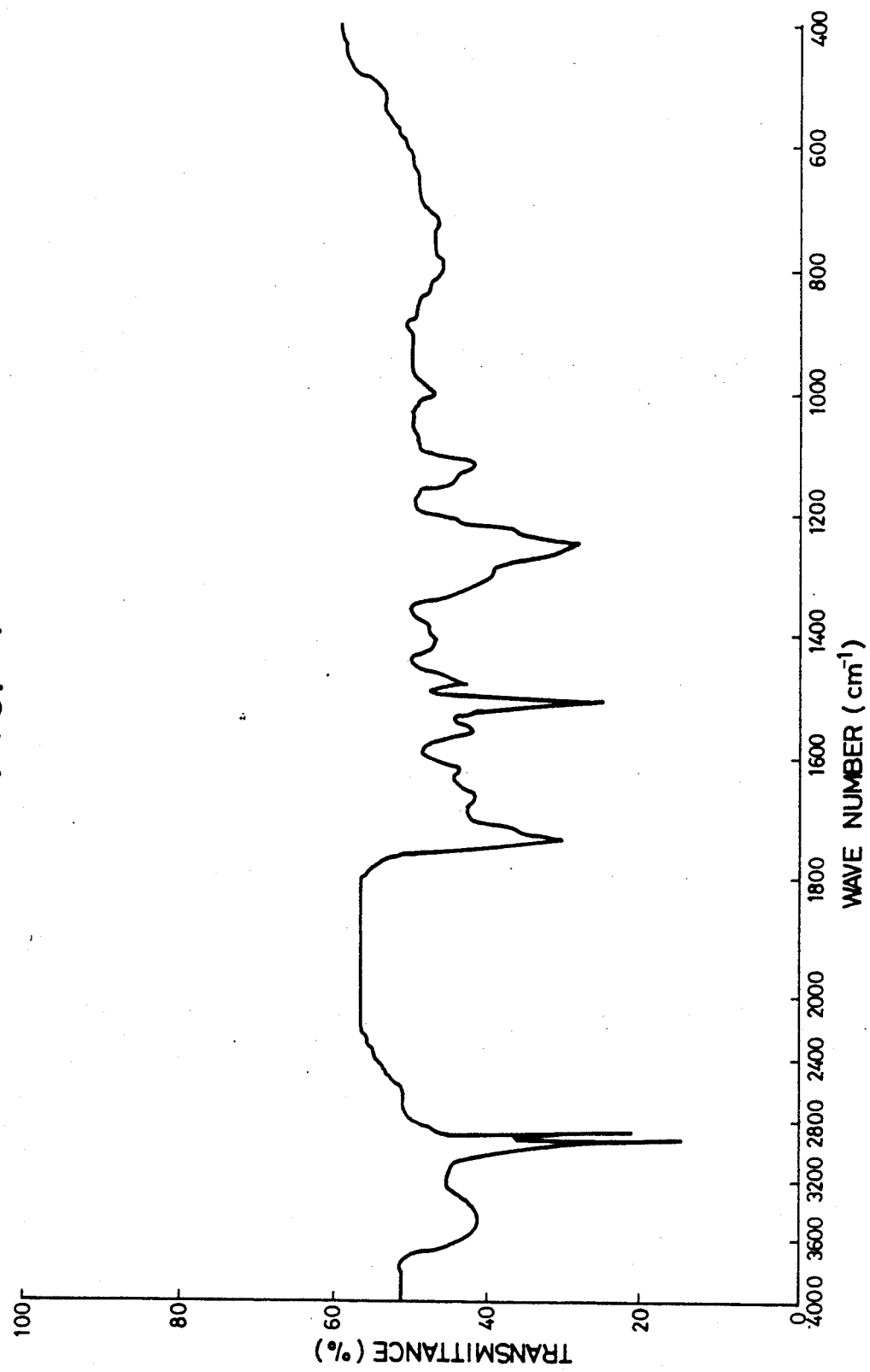
FIG. 1 indicates the infrared absorption spectrum of the high polymer obtained in Example 1, and FIG. 2 indicates the result of the thermogravimetric analysis.

In this invention high polymers are modified so that they can be formed into film by the Langmuir-Blodgett technique by introducing the substituent groups for imparting hydrophobic property to the repeating units of said high polymers, and the thus modified high polymers are used for the film formation by the Langmuir-Blodgett technique.

The material of the LB film used in this invention is a high polymer which contains linear repeating units comprised of the first organic group $R_1$ and the second organic group $R_2$, each being at least divalent and having at least two carbon atoms, and both being connected with each other by divalent bonding group, and at least one of the hydrocarbon-containing groups $R_3$ and $R_4$ of 10 to 30 carbon atoms, which may have substituent groups, bonded to the repeating units by covalent bonding.

To explain in more detail, the high polymers of this invention are composed of

  (1)

  (2)

  (3)

as the linear repeating units forming the basic skeleton.

Herein $R_1$ and $R_2$ are at least a divalent group having at least two carbon atoms, preferably 5 to 20 carbon atoms. It may be an aromatic group; an alicyclic group; an aliphatic group; a group wherein an aromatic group and an aliphatic group are combined; a group wherein each of the above-mentioned groups is substituted by a monovalent group having 1 to 30 carbon atoms selected from the group consisting of an aliphatic group, an alicyclic group, an aromatic group, and a group in which an aliphatic group is combined with an alicyclic group or an aromatic group; or a group wherein each of the preceding groups is substituted by a monovalent group such as a halogen atom, nitro group, amino group, cyano group, methoxyl group or acetoxyl group, or by a group in which the above monovalent group bonds to —O—, —COO—, —NHCO—, —CO—, —S—, —CSS—, —NHCS—, —CS—, or the like. Groups characterized by benzenoid unsaturation having at least 6 carbon atoms are preferred as $R_1$ and $R_2$ in points of heat resistance, chemical resistance and mechanical properties.

AB and BA in formulae (1) to (3) represent a divalent bonding group formed by the reaction of an acidic group A and a basic group B containing a hetero-atom such as O, N, S, P, B, etc. More particularly, they are the groups formed by the reaction of an acidic group such as —COOR (R is an alkyl group or a hydrogen atom The same shall apply hereinafter), —COX (X is Cl or Br. The same shall apply hereinafter), —NCO, —NCS, —CN, —CONHR, etc. and a basic group such as —NHR″, —OR″, —SR″, —X, etc., and AB is —CNH—, —CO—, —CS—, —NHCO—, —NHCS—,
        ‖       ‖      ‖
        O       O      O —NHCO—, —NHCS—, etc.; BA is —NHC—, —OC—,
  ‖         ‖                    ‖      ‖
  S         S                    O      O —SC—, —OCNH—, —SCNH—, —OCNH—, —SCNH—, etc.
  ‖      ‖        ‖        ‖        ‖
  O      O        O        S        S The high polymers of this invention are those which were modified so that they may be formed into films by the Langmuir-Blodgett technique by introducing into the repeating units as the basic skeleton shown by (1) to (3), at least one of the hydrocarbon-containing groups $R_3$ and $R_4$ of 10 to 30 carbon atoms, preferably 16 to 22, which may have substituent groups, bonded to said repeating units. The hydrocarbon-containing groups $R_3$ and $R_4$ that are contained may be two or more, respectively.

The above described modification may be carried out in the following three ways:

(I) $R_3$ ($R_4$) is substituted for the atom contained in AB or BA group in the linear repeating units of formulae (1) to (3).

(II) $R_3$ ($R_4$) is substituted directly in $R_1$, $R_2$.

(III) $R_3$ ($R_4$) is substituted through the substituent of $R_1$, $R_2$ that is other than the group used in forming the linear repeating units of $R_1$, $R_2$.

Needless to say, (I), (II), and (III) may be used in combination, and $R_3$, $R_4$ may be the same or different.

To illustrate (I), (II), and (III) in more detail,

| AB | | BA | |
|---|---|---|---|
| $\begin{array}{c}R_3\\|\\-C-N-\\‖\\O\end{array}$ | $\begin{array}{c}R_3\\|\\-N-C-O-\\‖\\O\end{array}$ | $\begin{array}{c}R_3\\|\\-N-C-\\‖\\O\end{array}$ | $\begin{array}{c}R_3\\|\\-O-C-N-\\‖\\O\end{array}$ |

-continued

| AB | | BA | |
|---|---|---|---|
| $\begin{array}{c}R_3\\|\\-N-C-S-\\‖\\O\end{array}$ | $\begin{array}{c}R_3\\|\\-N-C-O-\\‖\\S\end{array}$ | $\begin{array}{c}R_3\\|\\-S-C-N-\\‖\\O\end{array}$ | $\begin{array}{c}R_3\\|\\-O-C-N-\\‖\\S\end{array}$ |
| $\begin{array}{c}R_3\\|\\-N-C-S-\\‖\\S\end{array}$, etc. | | $\begin{array}{c}R_3\\|\\-S-C-N-\\‖\\S\end{array}$, etc. | |

$R_4$ may be used in place of $R_3$ (I) is, as shown by the above table, a method wherein $R_3$ ($R_4$) is substituted for the hydrogen atom on the nitrogen atom of AB or BA.

(II) is a method wherein $R_3$ ($R_4$) is substituted directly in $R_1$, $R_2$. Some of the examples are shown below.

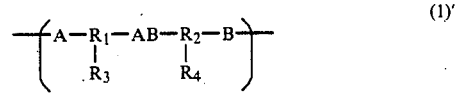  (1)′

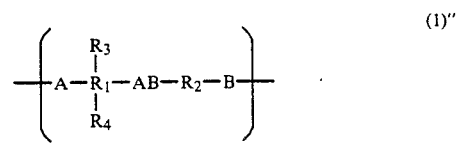  (1)″

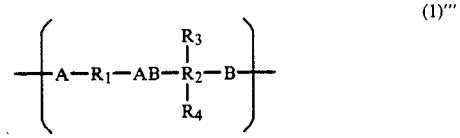  (1)‴

(III) is a method which contains many possibilities as shown below in more detail.

In the method of (III) at least one of $R_1$ and $R_2$ is at least trivalent, and $R_3$ ($R_4$) is substituted through the substituent which is other than the group used in forming the repeating units containing $R_1$, $R_2$. Of course, though not limited to these, the following illustrate the cases where the valence of $R_1$ is the same as or larger than that of $R_2$ with the valence being taken to be up to 6.

| | Valence of $R_1$ | Valance of $R_2$ |
|---|---|---|
| ① | 3 | 2 |
| ② | 4 | 2 |
| ③ | 5 | 2 |
| ④ | 6 | 2 |
| ⑤ | 3 | 3 |
| ⑥ | 4 | 3 |
| ⑦ | 5 | 3 |
| ⑧ | 6 | 3 |
| ⑨ | 4 | 4 |
| ⑩ | 5 | 4 |
| ⑪ | 6 | 4 |
| ⑫ | 5 | 5 |
| ⑬ | 6 | 5 |
| ⑭ | 6 | 6 |

Herein there are also listed up the examples in which $R_1$, $R_2$ are higher than quintavalent, but $R_1$, $R_2$ are preferably up to tetravalent as follows:
$R_1=3$, $R_2=2$ valent
$R_1=4$, $R_2 2$
$R_1=3$, $R_2 3$ $R_1=4$, $R_2$ 3
$R_1=4$, $R_2$ 4.
The possible examples are listed in the following.
When $R_1=3$, $R_2=2$,
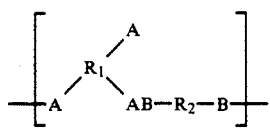 (4)
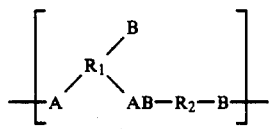 (5)
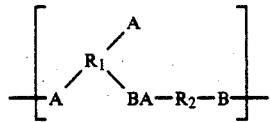 (6)
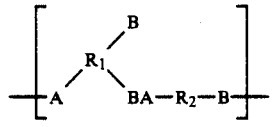 (7)
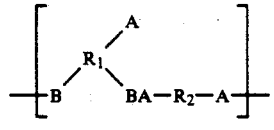 (8)
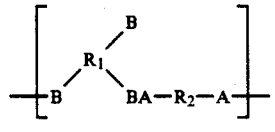 (9)
When $R_1 = 4$, $R_2 = 2$,
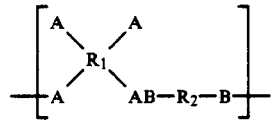 (10)
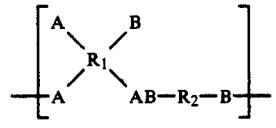 (11)
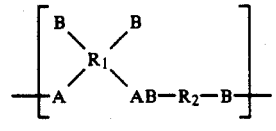 (12)
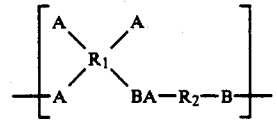 (13)
-continued
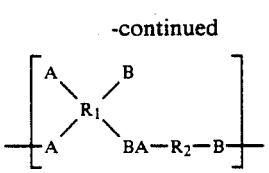 (14)
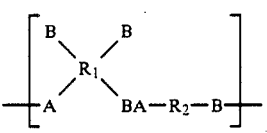 (15)
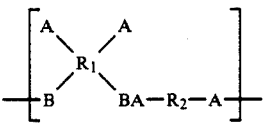 (16)
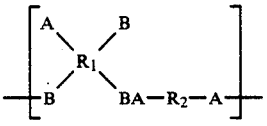 (17)
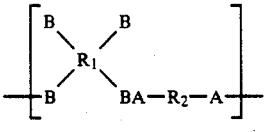 (18)
When $R_1 = 3$, $R_2 = 3$,
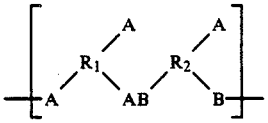 (19)
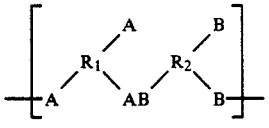 (20)
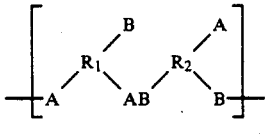 (21)
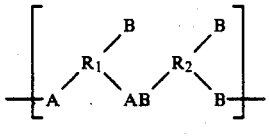 (22)
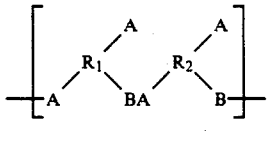 (23)
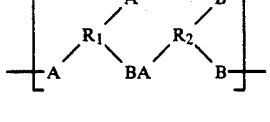 (24)

-continued
(25) 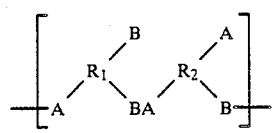
(26) 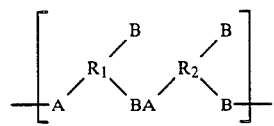
(27) 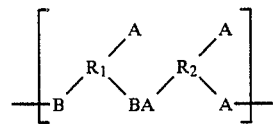
(28) 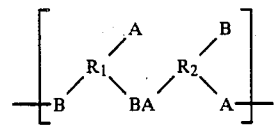
(29) 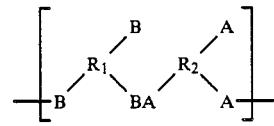
(30) 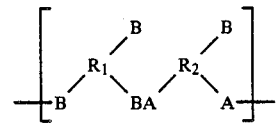
When $R_1 = 4$, $R_2 = 3$,
(31) 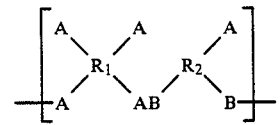
(32) 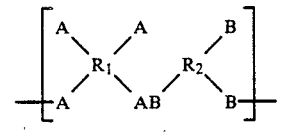
(33) 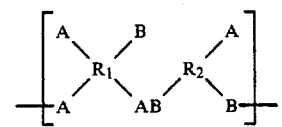
(34) 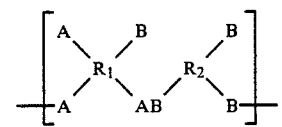
(35) 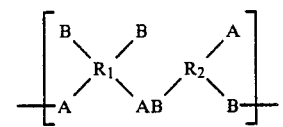
-continued
(36) 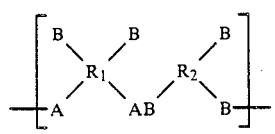
(37) 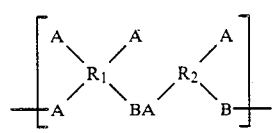
(38) 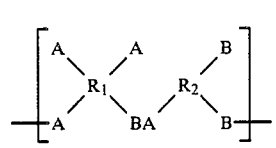
(39) 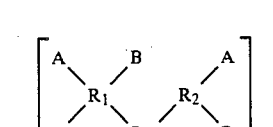
(40) 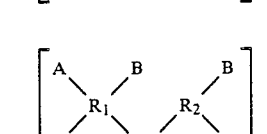
(41) 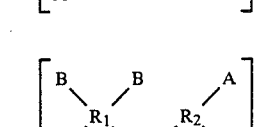
(42) 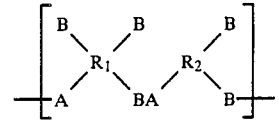
(43) 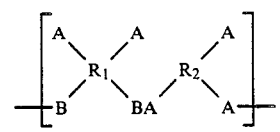
(44) 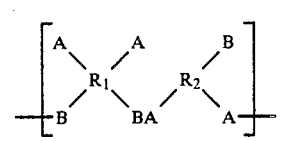
(45) 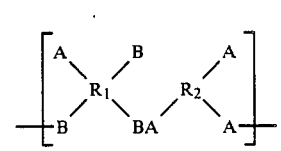
(46) 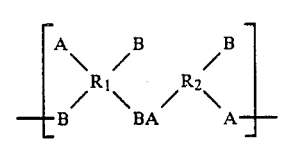

-continued
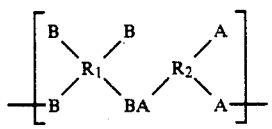 (47)
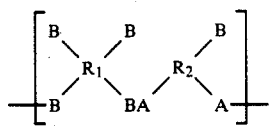 (48)
When R₁ = 4, R₂ = 4,
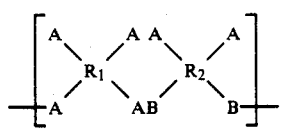 (49)
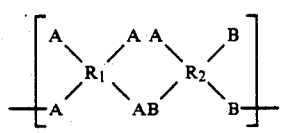 (50)
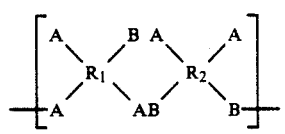 (51)
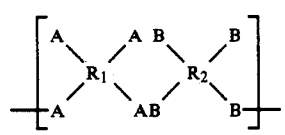 (52)
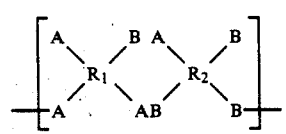 (53)
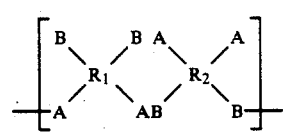 (54)
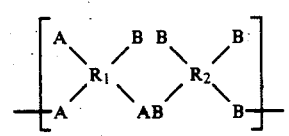 (55)
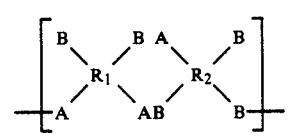 (56)
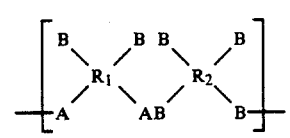 (57)
-continued
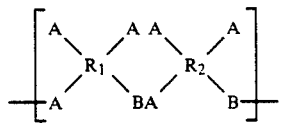 (58)
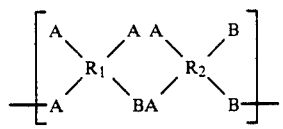 (59)
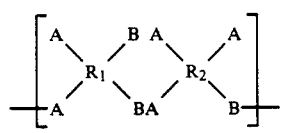 (60)
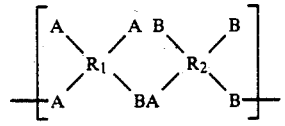 (61)
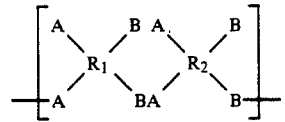 (62)
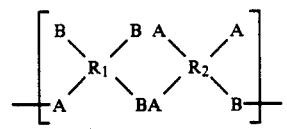 (63)
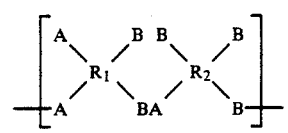 (64)
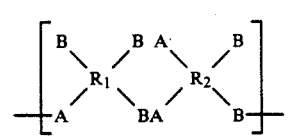 (65)
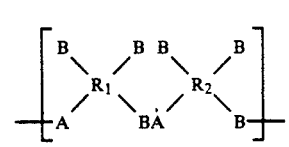 (66)
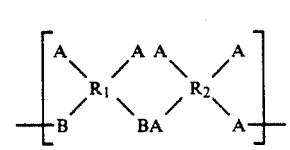 (67)
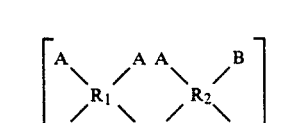 (68)

-continued

(69) 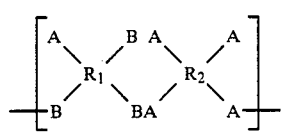

(70) 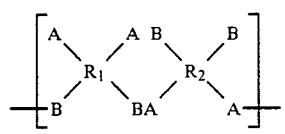

(71) 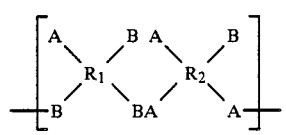

(72) 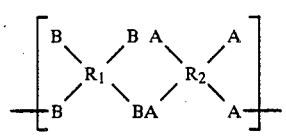

(73) 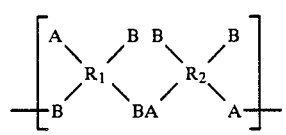

(74) 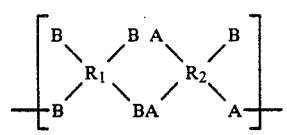

(75) 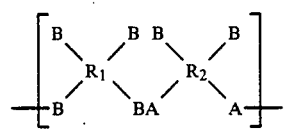

In formulae (4) to (75) there are A/B which are not used in forming the linear repeating units but (III) is the method by which $R_3$ ($R_4$) is substituted through these substituent groups. For instance, if such a group is A in (4) to (75), —COOR$_3$ (R$_4$), —CONHR$_3$ (R$_4$), —NHCOOR$_3$ (R$_4$), —NHCSOR$_3$ (R$_4$), —S0$_2$NHR$_3$ (R$_4$), etc., and if B, —NHR$_3$ (R$_4$), —OR$_3$ (R$_4$), —SR$_3$ (R$_4$), etc. can be substituted.

$R_1$, $R_2$ are an organic group which is at least divalent having at least two carbon atoms, but they are preferably of the benzenoid unsaturation having at least 6 carbon atoms.

The term "benzenoid unsaturation" as used in this invention is used for the structure of carbocyclic compounds in contrast to the quinoid structure, and means the same structure as the carbon ring contained in the ordinary aromatic compounds.

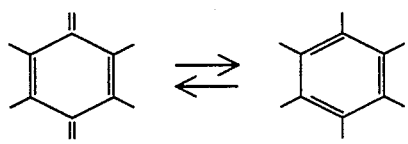

p-Quinoid

To explain $R_1$, $R_2$ in more detail, the preferable examples will be given below.

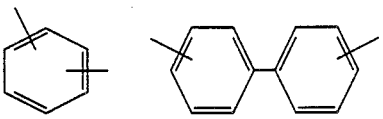

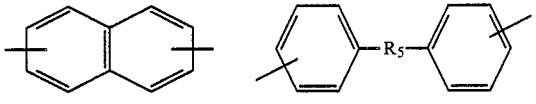

wherein
$R_5$ is

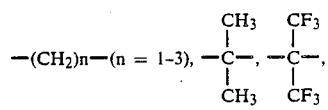

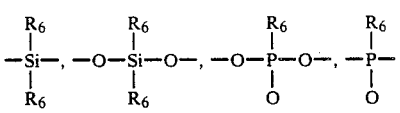

$R_6$: alkyl or aryl group

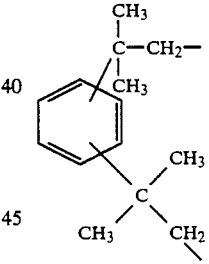

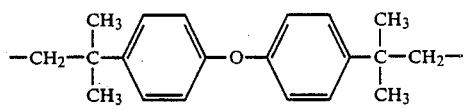

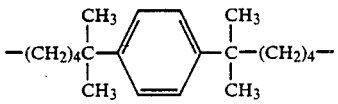

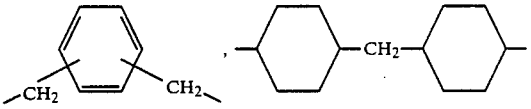

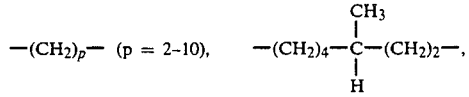

-continued
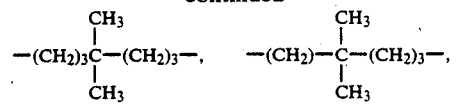
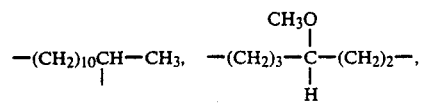
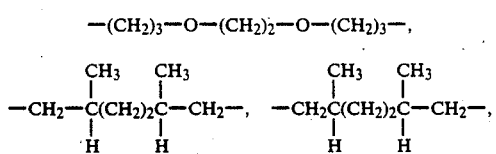
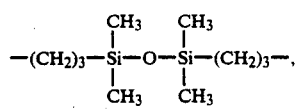
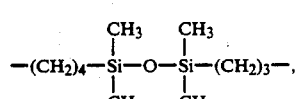
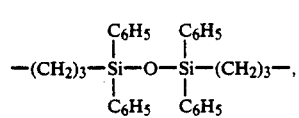
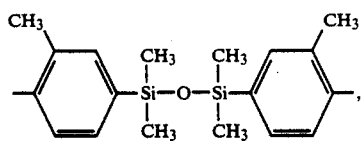
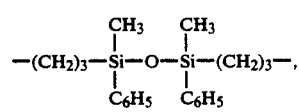
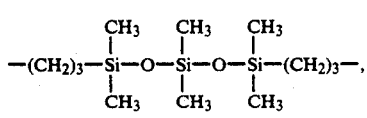
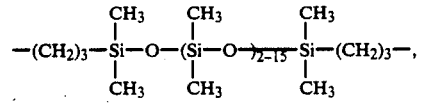
and the like.
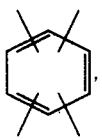 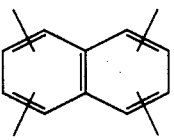
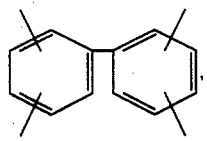 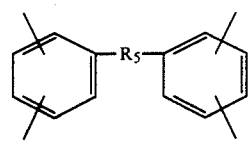
($R_5$ is as defined before)
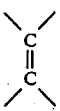 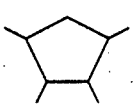
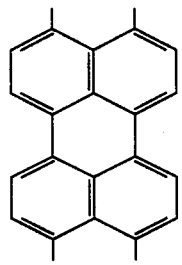
Of the foregoing more preferable examples for $R_1$ and $R_2$ are:
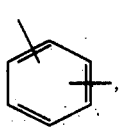 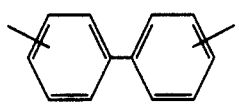
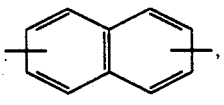 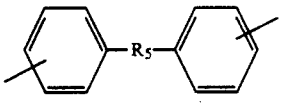
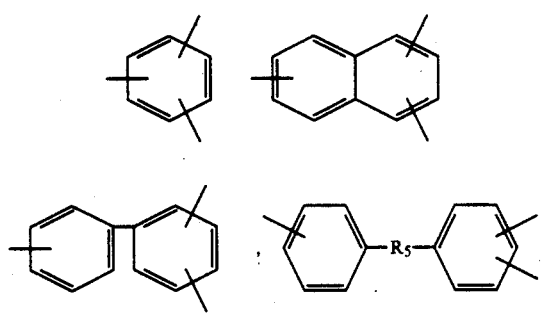
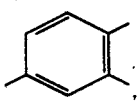 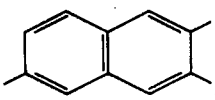
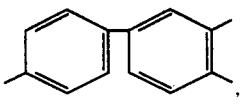 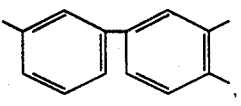
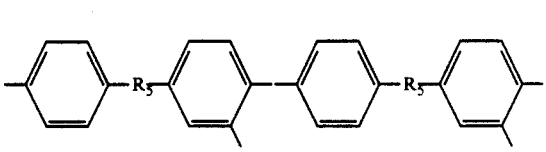
($R_5$ is as defined before)

-continued

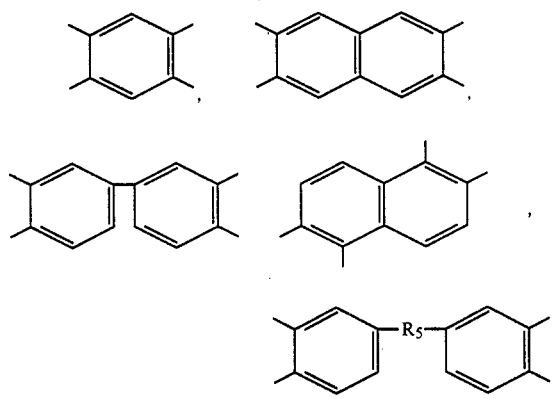

(R$_5$ is as defined before)

R$_3$, R$_4$ are the hydrocarbon-containing groups of 10 to 30, preferably 16 to 22 carbon atoms, and the preferable example is a monovalent group selected from aliphatic group, aliphatic group bonded with alicyclic group, aliphatic group bonded with aromatic group, or the substituent group thereof as listed below.

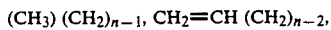
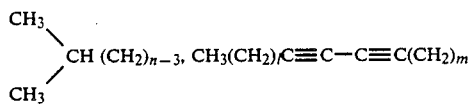
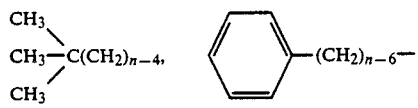
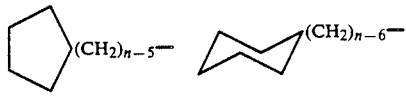

Herein $l+m=n-5$, $n=10-30$, or preferably 16-22, and more preferable examples are straight chain aliphatic hydrocarbon groups.

As the substituent groups there may be mentioned halogen atom, nitro group, amino group, cyano group, methoxy group, acetoxy group, etc., but these are not indispensable, although fluorine atom is sometimes used in preference because it can improve the hydrophobic property more than hydrogen atom.

That is to say, the length of the alkyl chain can be shortened by introduction of fluorine. For instance, in $C_8F_{17}(CH_2)_k$—, $K=2$ will suffice, and film formation may be rendered possible with 10 carbon atom.

The actual examples of the high polymers which can be used in the process for forming a film of this invention will become clear by substituting in formulae (1) to (75) the actual examples of R$_1$, R$_2$, R$_3$, R$_4$, A, B, AB, and BA and the actual examples of the methods of substituting R$_3$, R$_4$. Although no copolymer is contained in formulae (1) to (75), needless to say, the copolymers that can be known by analogy from them are also within the scope of this invention. The mixture of the high polymers in this invention are also within the scope of this invention.

Further, though not indispensable, the high polymers of this invention may be those which have been substituted by a group containing a hydrocarbon of 1 to 9 carbon atoms according to the method (I), (II), or (III).

The molecular weight of the high polymers of this invention is not particularly limitative, and even when the molecular weight is low, film formation is possible by the process of this invention, but the heat resistance, mechanical strength and chemical resistance of the film obtained are not good. On the other hand, when the molecular weight is too large, the viscosity also becomes too high for the film formation to be feasible.

Accordingly, the number average molecular weight should preferably be on the order of 2,000 to 300,000.

The practical examples of the high polymers of this invention which can be derived from formulae (1) to (75) are as follows.

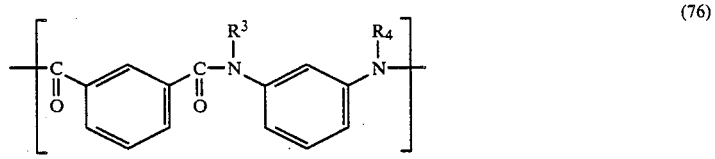

(76)

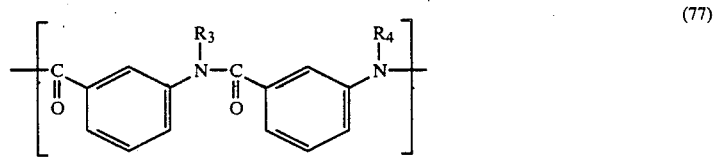

(77)

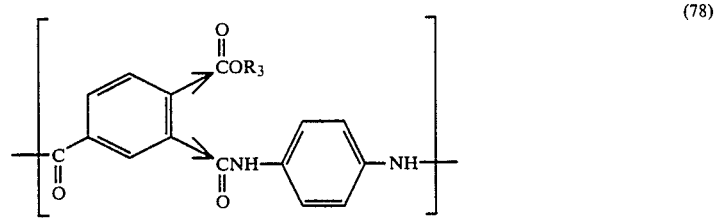

(78)

-continued
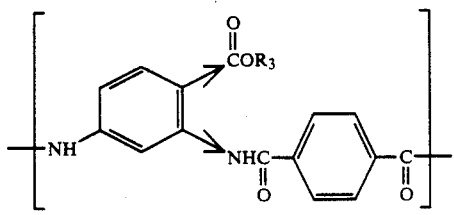
(79)
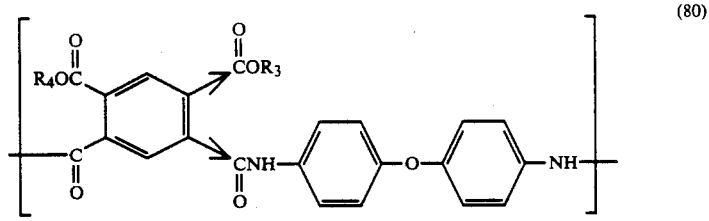
(80)
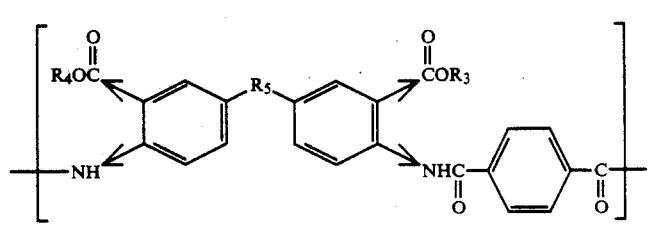
(81)
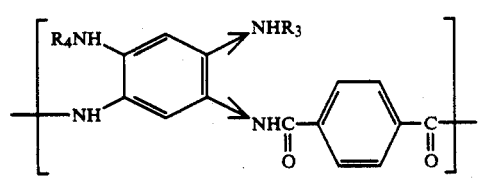
(82)
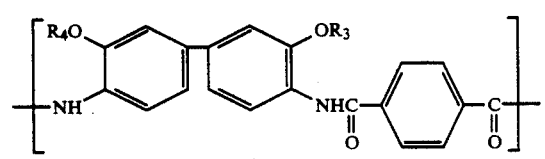
(83)
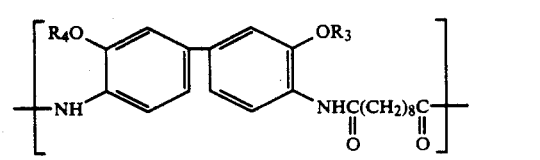
(84)
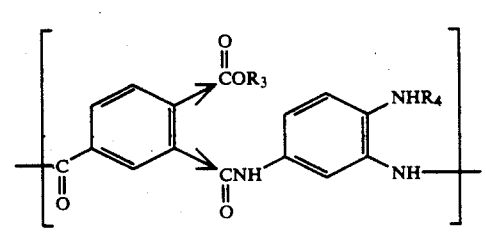
(85)
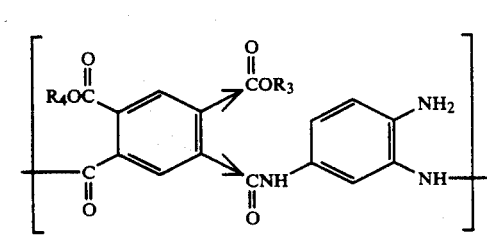
(86)

-continued
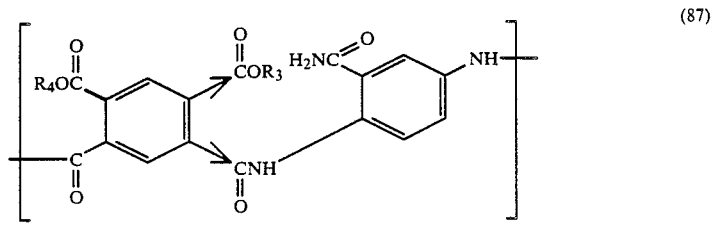
(87)
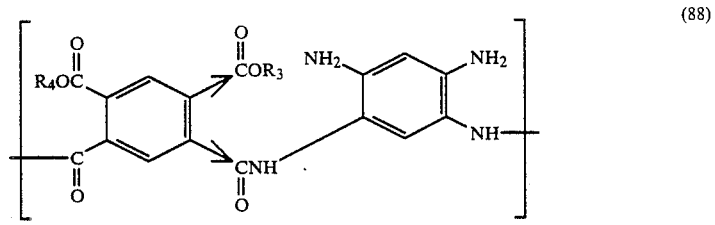
(88)
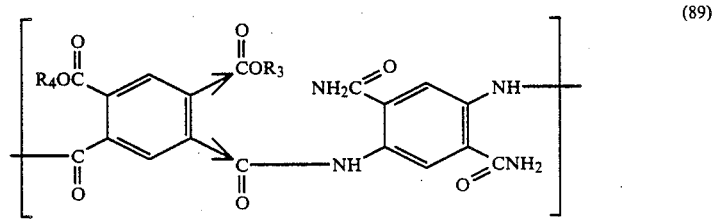
(89)
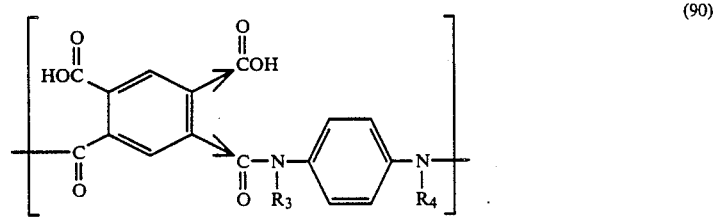
(90)
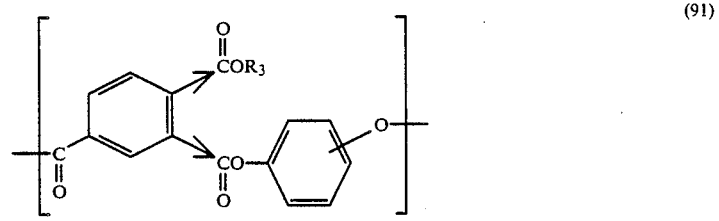
(91)
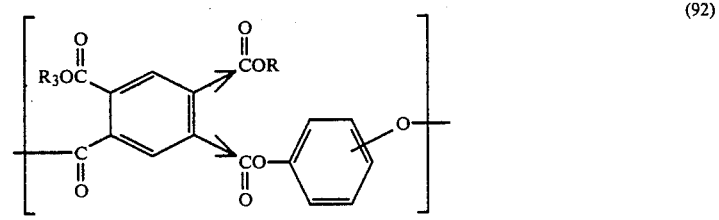
(92)
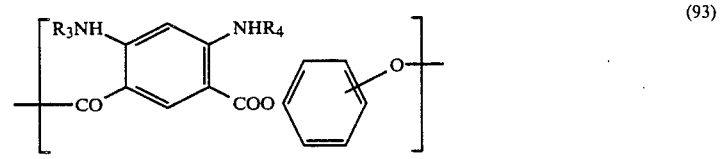
(93)

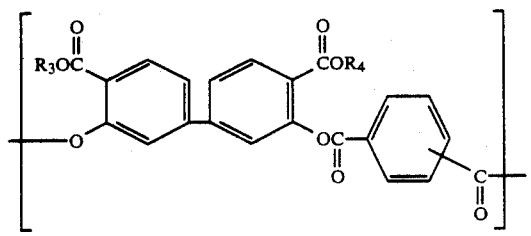
(94)

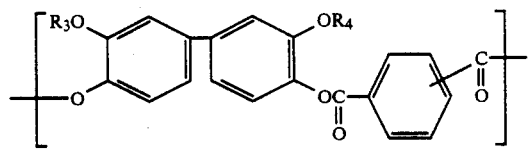
(95)

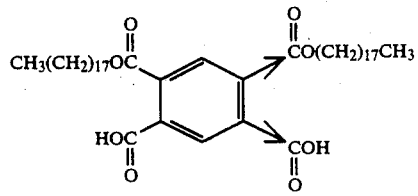
(20)

In the above formulae "→" indicates isomerization. For instance, the case of formula (78) may be explained as follows.

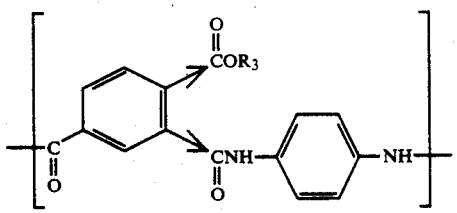
(78)

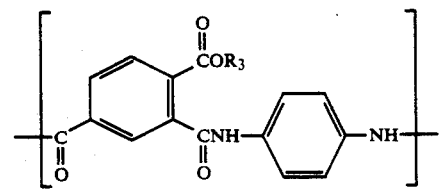
(78-1)

and

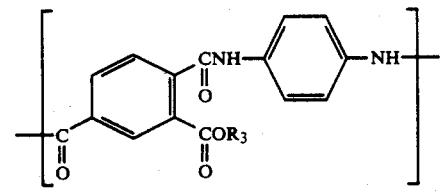
(78-2)

This invention involves both cases where each of (78-1) and (78-2) exists singly and where (78-1) and (78-2) co-exist.

The other examples may be found in books such as "Heat Resistance of High Polymer" (published by Baifukan, Mar. 5, 1970) and "Thermal Decomposition and Heat Resistance of High Polymer" (published by Baifukan, Mar. 15, 1974) edited by Hirotaro Kambe; etc.

Now with reference to the case where $R_3=R_4=CH_3(CH_2)_{17}-$ in formula (80) the process for preparation of these modified high polymers will be explained below. The compound which is obtained by the alcoholysis of pyromellitic acid dianhydride is acylated with thionyl chloride at a temperature of not lower than $-10°$ C., a temperature up to near the boiling point of the acid halide being preferable about 0°–40° C. in an organic polar solvent under a substantially anhydrous condition, followed by reacting the resulting product with diaminodiphenyl ether at a temperature of not lower than $-10°$ C., preferably $-10°$ C. to $+20°$ C., more preferably from 0° to $+10°$ C. However, in the latter stage of the reaction, the use of reaction temperature over 20° C. is favorable to complete the reaction. The acylation and the amidation are usually carried out at a temperature between about 0° C. to $-10°$ C., but as the substituent groups such as long chain alkyl groups, etc. have the tendency of freeze solidifying in this invention, they should preferably be carried out at a temperature of not lower than $-10°$ C. In the above case, of course, either raw materials having different substituent groups may also be mixed to give copolymers, or tetracarboxylic acid dianhydride or diamine having no substituent group or having substituent groups not more than 10 carbon atoms may be mixed in an amount of about 0 to 30%.

The amphiphilic polyimide precursor thus prepared may be used as the material of the LB film after having been separated and purified, or may be made directly into a spreading solution of the LB film by adding chloroform, benzene, or the like thereto after the preparation.

Next, explanation will be given of the LB film used in this invention.

The process for forming LB film comprises spreading a film-forming material on the surface of water, compressing the material thus spreaded on the surface of water at a constant surface pressure to form a monomolecular film, and then transferring the film formed onto a substrate by repeatedly passing the substrate through the film. Besides the above described process (the vertical dipping method) there may be mentioned horizontal dipping method, revolving cylindrical method, etc.

"Shin Jikken Kagaku Koza" vol. 18, "Interface and Colloid", 498–508). Thus, any of the processes usually carried out can be used optionally.

The Langmuir-Blodgett technique is an excellent method for forming oriented thin films of not less than 1000 Å, or of several hundreds Å or several tens Å in thickness with an accuracy of some tens Å, and thus, the thin films on the substrate of this invention may also have the same characteristics. However, even the films having a thickness of 10,000 Å or more can also be obtained by the technique.

In general, the solvent is selected from benzene, chloroform, etc. that are insoluble in water and vaporise in the gaseous phase, but in the case of the high polymers of this invention, it is desirable that in order to enhance the solubility an organic polar solvent is used in combination. The preferable organic polar solvent is N,N-dimethylformamide, N,N-dimethylacetamide, N,N-diethylformamide, N,N-diethylacetamide, N,N-dimethylmethoxyacetamide, dimethyl sulfoxide, N-methyl-2-pyrrolidone, pyridine, dimethylsulfone, hexamethylphosphoramide, tetramethylenesulfone, dimethyltetramethylenesulfone, etc.

When benzene, chloroform, etc. are used in combination with the organic polar solvent, it is considered that during the spreading benzene, chloroform, etc. vaporise into the gaseous phase, while the organic polar solvent is dissolved in a large amount of water.

The substrate used in this invention is limited depending on to what the thin film of this invention is applicable, but otherwise there is no particular limitation, so that as the substrate use can be made of not only the general inorganic substrates such as glass, alumina, quartz, etc., but also metals, plastics, semiconductors of Groups IV, III-V, II-VI, etc. such as Si, GaAs, ZnS; ferroelectric substances such as $PbTiO_3$, $BaTiO_3$, $LiNbO_3$, $LiTaO_3$; etc. Also, use can of course be made of those which were subjected to surface treatment as usually carried out in practice.

This invention is characterized in that high polymers having a good heat resistance can be formed into thin films on a substrate by the Langmuir-Blodgett technique, and moreover, in some cases thin films having a still further improved heat resistance can be formed on a substrate by causing ring closure to take place partially or wholly in the thin films.

Among the examples of (76) to (95), (78) to (90) are the cases where the ring closure takes place partially or wholly to form a five- or six-membered ring containing hetero atoms, with the structure after the complete ring closure being shown below.

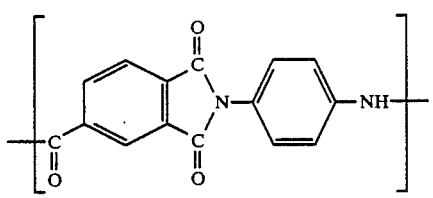

(78)'

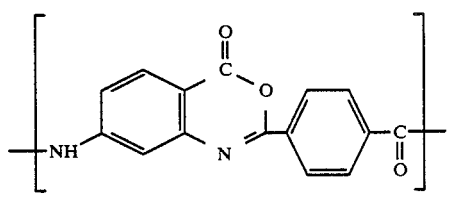

(79)'

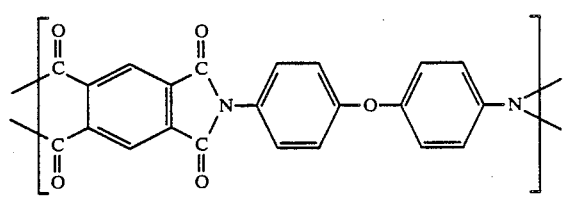

(80)'

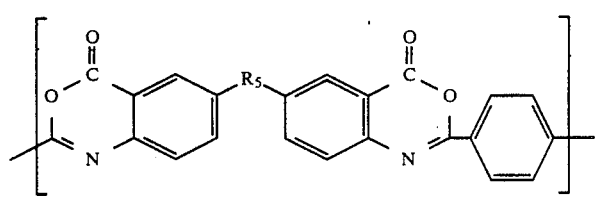

(81)'

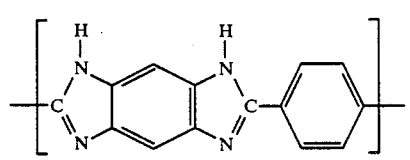

(82)'

-continued
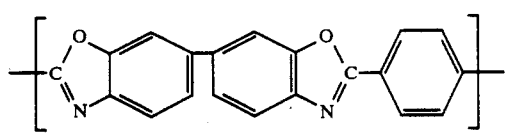
(83)'
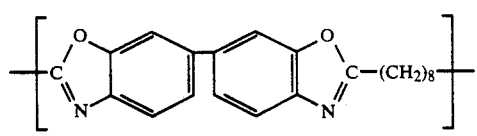
(84)'
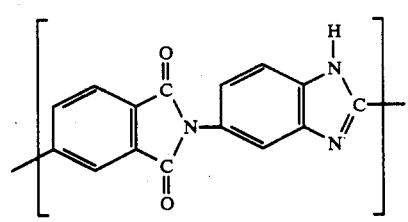
(85)'
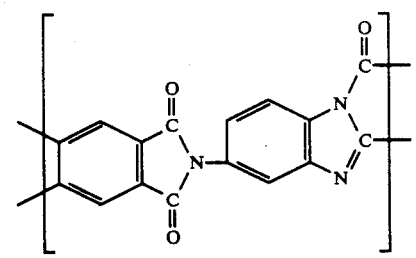
(86)'
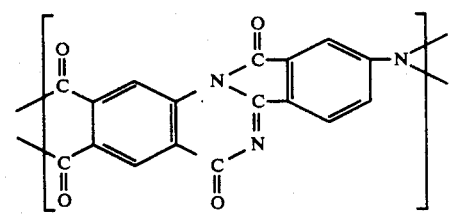
(87)'
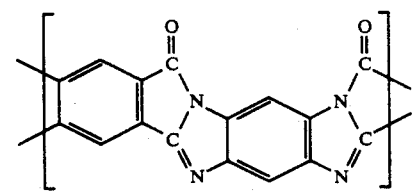
(88)'
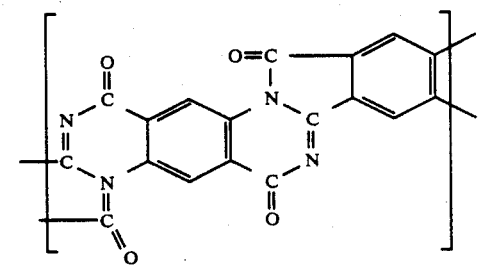
(89)'

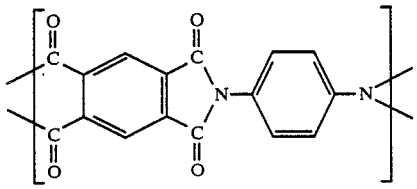
(90)'

There is no particular limitation to the process for ring closure, but, for instance, in the case of the imidation of the isomeric compound of the formula (80), by heating to 200° to 400° C., the following reaction takes place and the ring closure is accomplished.

High polymer of formula (80)

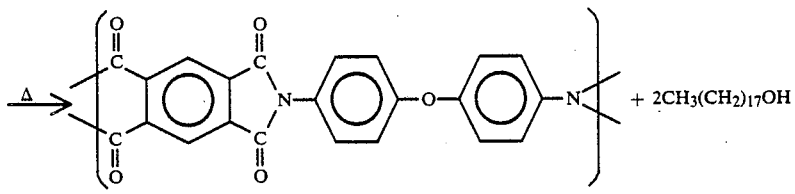

In the above case, the group which was introduced for the purpose of increasing the hydrophobicity is eliminated as an alcohol, but as the eliminated alcohol can be removed at a temperatures of 200° to 400° C., if required, under a gas flow or a vacuum, highly heat-resistant polyimide thin films can be obtained.

Now, reference will be made to the uses of these thin films.

The thin films of this invention can be used not only in the field of electronics, but also in the extensive fields such as energy conversion, material separation, etc. by making the most of the characteristic feature such that they are extremely thin films excellent in heat resistance, chemical resistance, and mechanical strength.

In the field of electronics, wherein conductivity, photo-conductivity, optical characteristics, insulating ability, thermal characteristics, or chemical reactivity are made the most of, they can be used as optical recording film, resist film, insulating film, thin film for capacitor, liquid crystal orientation film, polarizing film, sensor film, etc., and above all, as the insulating film, they can be used as the insulating layer in the electrical and electronic elements having the structure of MIS, MIM, etc. in which various kinds of semiconductors or metals have been combined therewith as the insulating layer of IC or LSI, and also, can be made into field-effect transistor, photoelectric device, light emitting device, light receiving device, light detecting device, thermionic transistor, etc. In particular, the thin films of this invention are effective in MIS, MIM devices utilizing tunnel effect, and also, can be used as the insulating film of JJ (Josephson Junction).

Besides the above it is considered that the thin films of this invention can also be used as the cladding material or the optical circuit element for waveguide.

In all the fields they will also be adapted for use as coating material for protection, and further, in the techniques generally used in the field of the LB film to obtain the mixed film or laminated film of the functional LB material and fatty acid, if the high polymer of this invention is used in place of the fatty acid, it is possible to obtain films which can manifest various functions, so that many uses are considered for these films. For instance, by preparing the films containing dyes, enzymes, etc. photoelectric sensing element, biosensor, etc. can be obtained.

Still further, the use of these films in the field of material separation may also be considered.

With reference to some examples the process for preparation of the high polymers of this invention and the process for forming films will be explained below.

EXAMPLE 1

2.18 g (0.01 mole) of pyrromellitic acid dianhydride and 5.40 g (0.02 mole) of stearyl alcohol were reacted at about 100° C. for 3 hours in a flask while passing dry nitrogen therethrough.

The reaction product obtained was dissolved in 40 cc of hexamethylphosphoramide and cooled to 0° to 5° C. Then 2.38 g of thionylchloride was dropwise added thereto at about 5° C., and after the dropping about 5° C. was maintained for one hour and the reaction was completed.

Thereafter 2 g (0.01 mole) of diaminodiphenyl ether dissolved in 50 cc of dimethylacetamide was dropwise added at 0° to 5° C., and after the dropping the reaction was continued for about one hour, and then the reaction mixture was poured into 600 cc of distilled water to precipitate the reaction product, which was filtered and dried at 40° C. to give about 9 g of pale yellow powder.

IR spectrum analysis, thermogravimetric analysis (TGA-DTA), and measurement of molecular weight by GPC were carried out with the following results.

IR Spectrum Analysis

The IR chart taken by KBr disc process is as shown in FIG. 1, in which the characteristic absorptions of ester, amide I, II, III, alkyl chain, and ether are seen.

Thermal Analysis (TGA-DTA)

Figure 2:
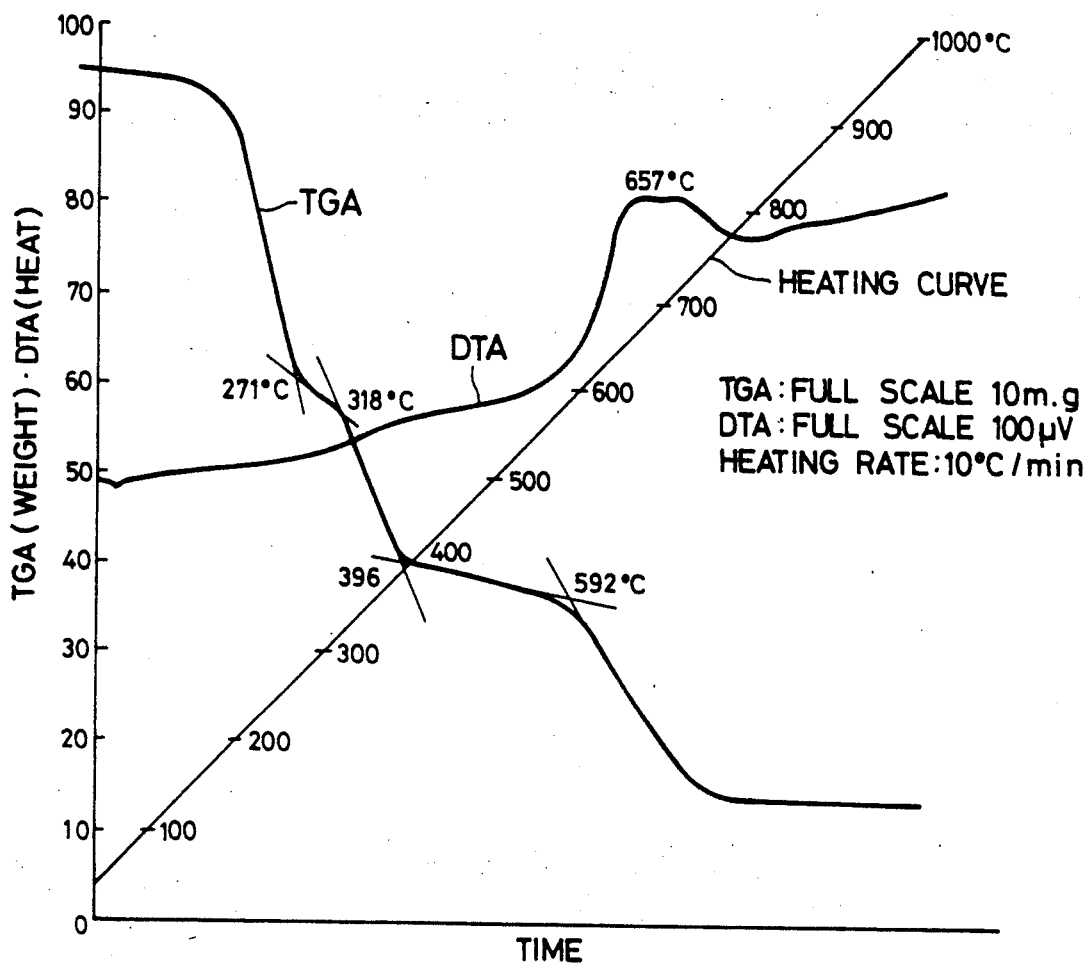

The result of the measurement using an apparatus of RTG-DTA (H) type analyser manufactured by Rigaku Denki with full scale 10 mg for TGA and 100 $\mu$V for DTA by elevating the temperature at a rate of 10° C./min to 1000° C., in a nitrogen flow (30 ml/min) is as shown in FIG. 2. In the TGA there are inflection points at 192°, 271°, 318°, 396° and 592° C., and in the DTA there is a characteristic peak near 657° C.

Figure 3:
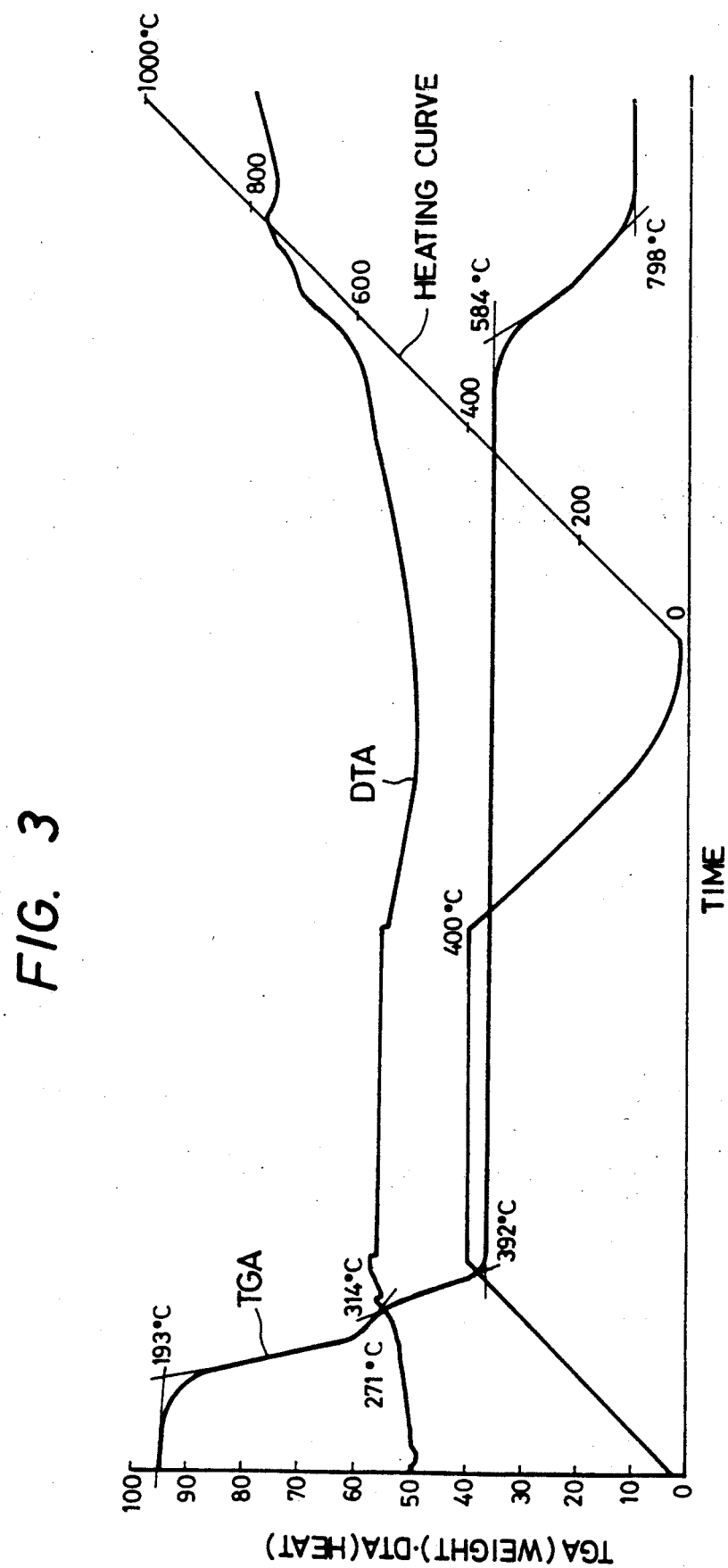
FIG. 3 indicates the weight changes (TGA) and the heat changes (DTA) when the temperature was elevated from room temperature to 400° C., after holding this temperature for one hour, lowered to room temperature, and then elevated to 1000° C.

On the other hand FIG. 3 shows the result when the temperature was raised to 400° C. at a rate of 10°

C./min. and after having been held at 400° C. for one hour, returned to room temperature, and then raised to 1000° C. at a rate of 10° C./min. By holding the temperature at 400° C. for one hour the weight attained almost a constant weight indicating the termination of the polyimidation reaction. Even when this product was cooled to room temperature and again heated there was no change in the weight until exceeding 450° C., and it was clearly shown that the thermal decomposition begins at 584° C. which is just the same as the thermal decomposition temperature of polyimide film. Thus, it was found that by the termination of the polyimidation reaction there is obtained a product whose heat resistance is comparable to that of polyimide film.

Measurement of Molecular Weight by GPC

The number average molecular weight which was computed by comparing the result of GPC measured in N,N-dimethylacetamide solvent with the standard sample of polystyrene was about 50,000.

EXAMPLE 2

25 ml of developing solution for LB film was prepared by dissolving 55.1 mg of the product in Example 1 in a mixed liquid of distilled chloroform/dimethylacetamide=8/2 (volume ratio).

Figure 4:
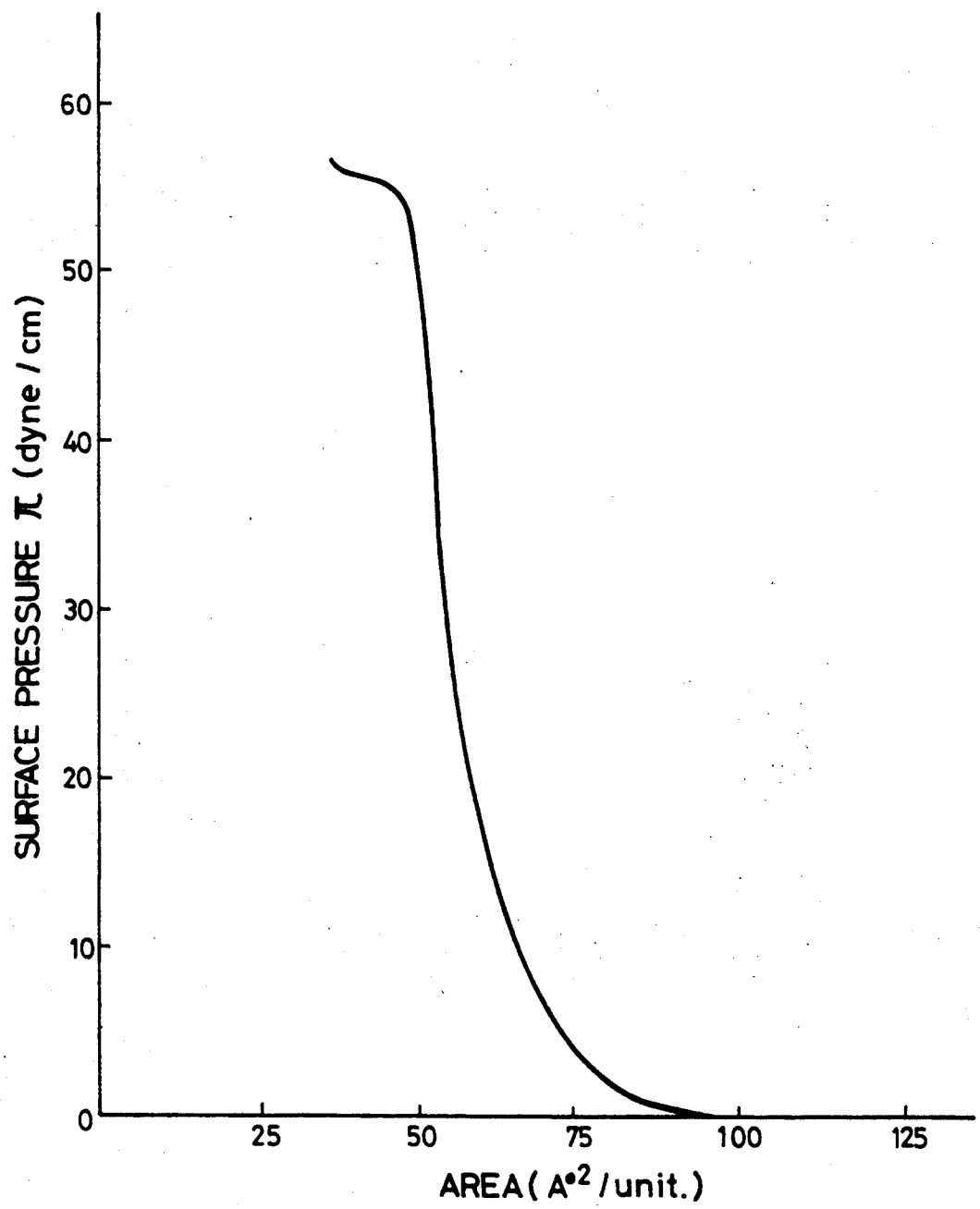
FIG. 4 indicates the relation between the surface pressure and the area per repeating unit when the precursor obtained in Example 1 was spread on the surface of water in accordance with Example 2.

On the surface of bi-distilled water at 20° C. the relation between the surface pressure and the area per repeating unit was measured, and there was obtained the result as shown in FIG. 4. The surface pressure rises rapidly from about 75 Å$^2$/unit and a good condensed film was formed. The limiting area was 60 Å$^2$/unit and the collapse pressure was also found to be 55 dyne/cm which is an extremely high value as high polymer film. Further, even when the film was held on the surface of water maintaining the surface pressure at 25 dyne/cm no decrease in the area was recognized over two hours, indicating the stability of the film.

Figure 5:
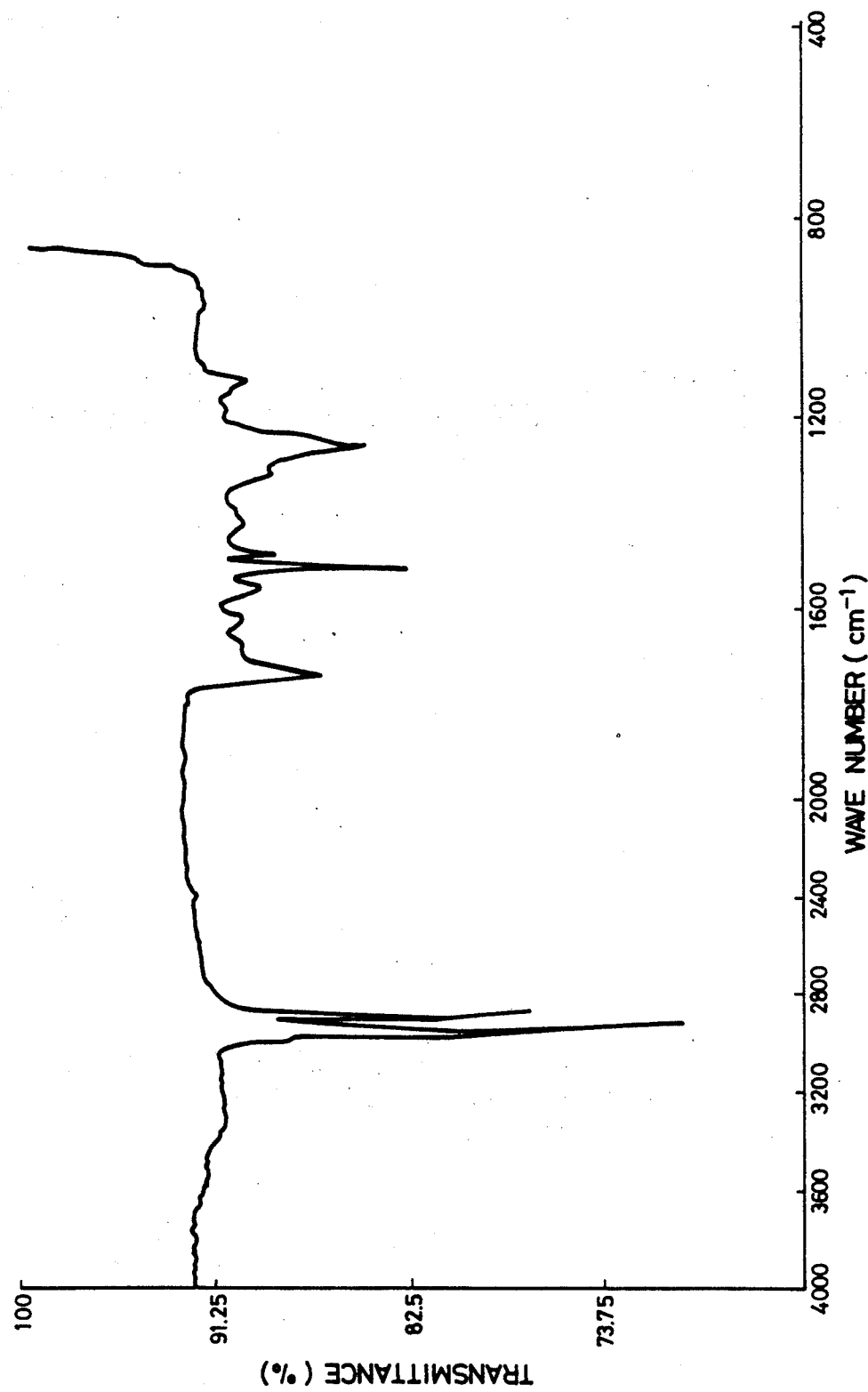
FIG. 5 indicates the result of the FT-IR of the product obtained by building up the above on a plate of $CaF_2$ by the Langmuir-Blodgett technique.

Next, maintaining the surface pressure of the film on the surface of water at 25 dyne/cm, built-up films of 61 and 60 layers, respectively, were deposited on a glass substrate and a CaF$_2$ plate at a dipping speed of 10 mm/min by LB technique. From the film obtained on the CaF$_2$ plate there was obtained FT-IR spectrum as shown in FIG. 5, which was found to coincide with IR of the compound obtained in Example 1. It was also confirmed that the built-up film was a Y type film according to the area-time curve. Further, in the X-ray diffraction of the built-up film, one peak was observed at $2\theta=4.65°$ despite that no Cd$^{++}$ ion was included in water used in this example.

Also, the built-up film obtained was about 1800 Å in thickness, and found to have a good insulation characteristic from the measurement of the capacitance.

Further, it was also confirmed from the peaks at 1790 and 1710 cm$^{-1}$ by FT-IR analysis that by heating the built-up film at 400° C. for one hour there is formed $\alpha$, $\beta$-unsaturated five-membered ring imide.

On the other hand, it has been confirmed from the IR spectrum that when the product in Example 1 is heated at 400° C. for one hour imidation reaction takes place resulting in a decrease of 58 wt % in the weight, which is in precisely conformity with the calculated value, 58.7%, when it is assumed that stearyl alcohol is eliminated by the imidation.

EXAMPLE 3

Figure 6:
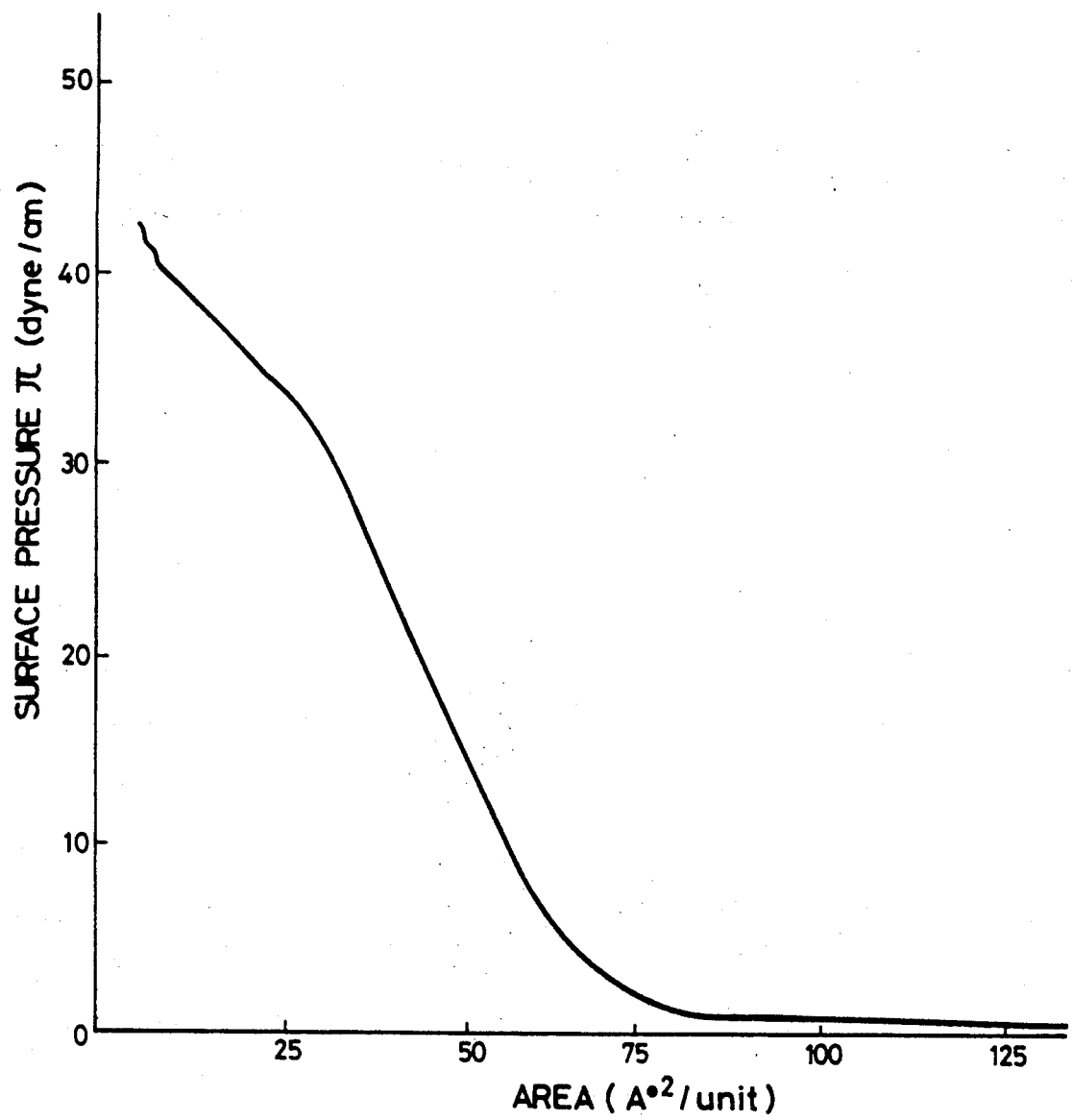
FIG. 6 indicates the surface pressure vs area curve of the precursor obtained in Example 3.

A polyimide precursor was synthesized in the same manner as Example 1 except that n-decyl alcohol (n—C$_{10}$H$_{21}$OH) was used in place of stearyl alcohol. The polyimide precursor showed the same characteristics as those of the polyimide in Example 1 by IR spectrum analysis, thermal analysis, and measurement of molecular weight by GPC, but the result of the measurement of the surface pressure vs. area curve is as shown in FIG. 6, in which there is found only the liquid expansion phase, but not the condensation phase. This clearly indicates that the alkyl group having 10 carbon atoms is too short in the chain length to obtain a stable monomolecular layer. For instance, the film maintained at 20 dyne/cm in surface pressure on the water surface was unstable, thus the precursor obtained in this Example did not give a good built-up film.

EXAMPLE 4

Polyimide precursors were prepared in the same manner as in Example 1 except that lauryl alcohol (C$_{12}$), myristyl alcohol (C$_{14}$) or cetyl alcohol (C$_{16}$) was used instead of stearyl alcohol.

The obtained precursor by using the C$_{12}$ or C$_{14}$ alcohol showed behaviors intermediate between those for C$_{10}$ and C$_{18}$, and formed a sufficiently stable monolayer and could form a built-up film.

The precursor obtained by using the C$_{16}$ alcohol formed a very stable monolayer on the water surface and could form a good built-up film.

Also, it was confirmed that the precursors obtained in these Examples were converted into polyimides by heat treatment.

EXAMPLE 5

Using trimellitic acid anhydride (0.01 mole) and stearyl alcohol (0.01 mole) in the same manner as in Example 1, monostearyl trimellitic acid ester was synthesized, and after acylating with thionyl chloride, diaminodiphenyl ether (0.01 mole) was reacted to give 2.12 g of white powder.

Figure 7:
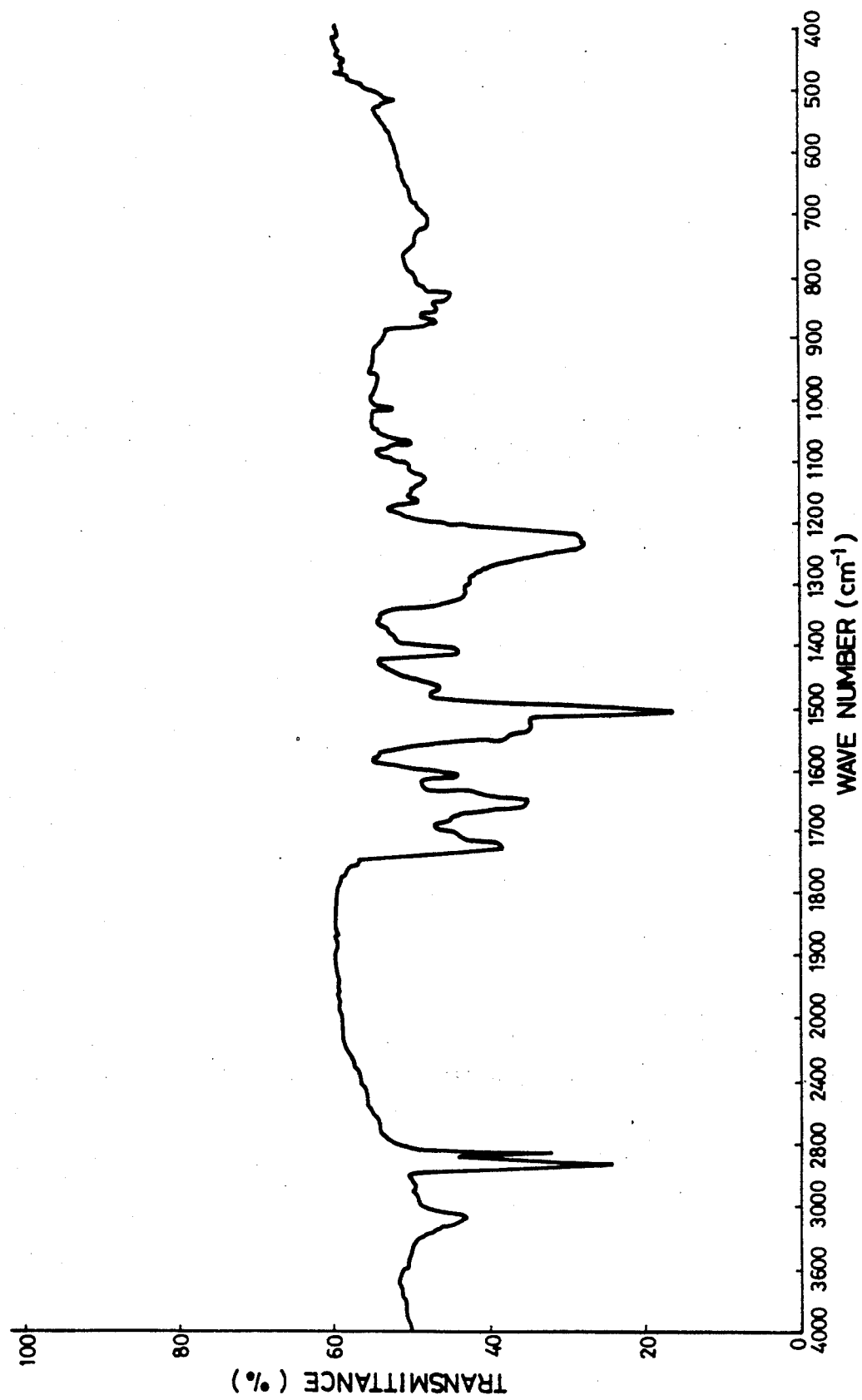
FIG. 7 is the infrared spectrum of the high polymer obtained in Example 5.
Figure 8:
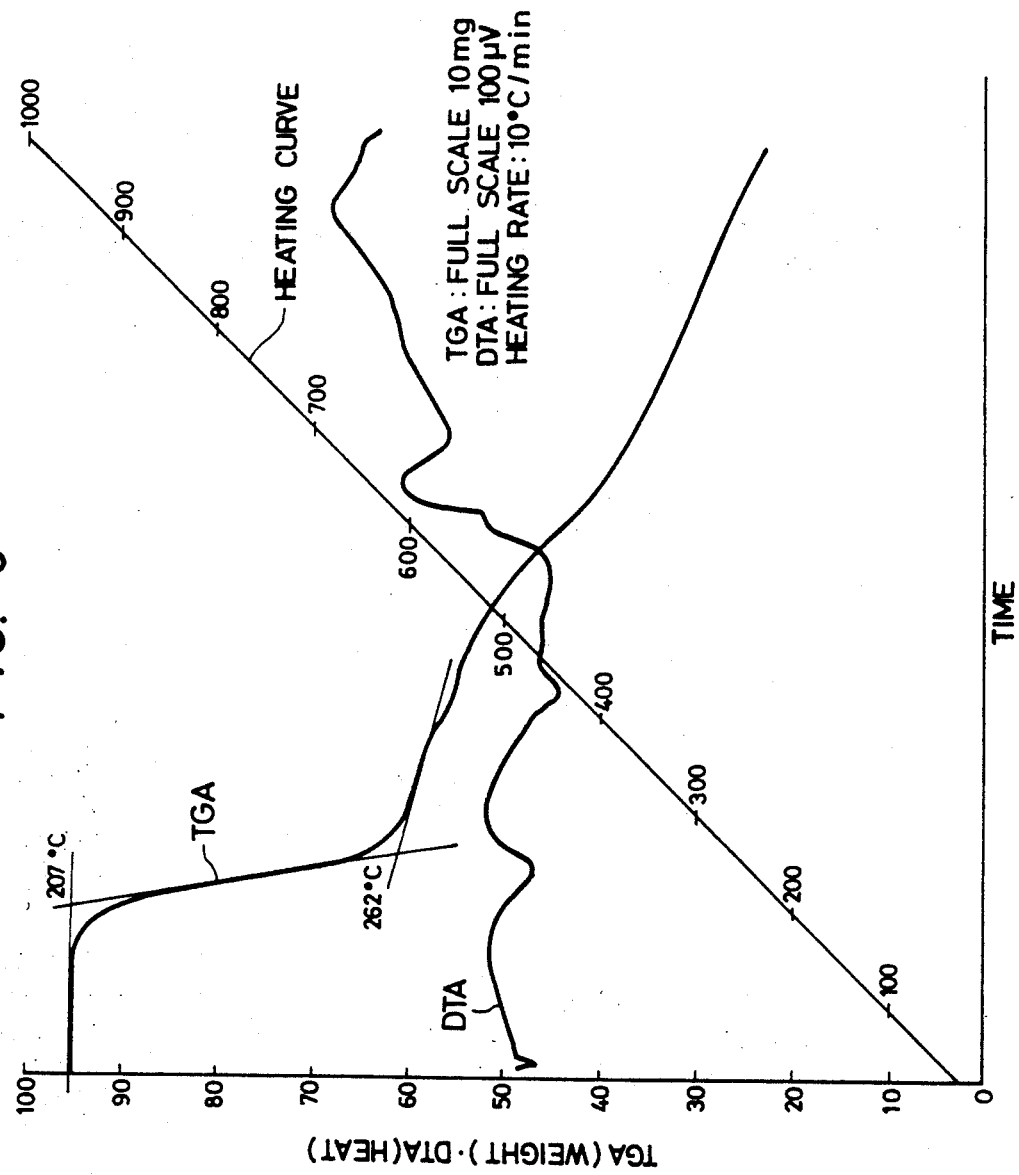
FIG. 8 is the result of the thermogravimetric analysis.

FIGS. 7 and 8 are the results of IR spectrum analysis and thermogravimetric analysis (TGA-DTA) of the product.

The IR spectrum analysis indicated the characteristic absorption the same in Example 1. Also, by the thermal analysis there are seen distinguished inflection points at 207° and 262° C. in TGA, and it was confirmed by the IR spectrum that after the inflection point at 262° C., the imidation is complete and polyamideimide is formed.

EXAMPLE 6

Figure 9:
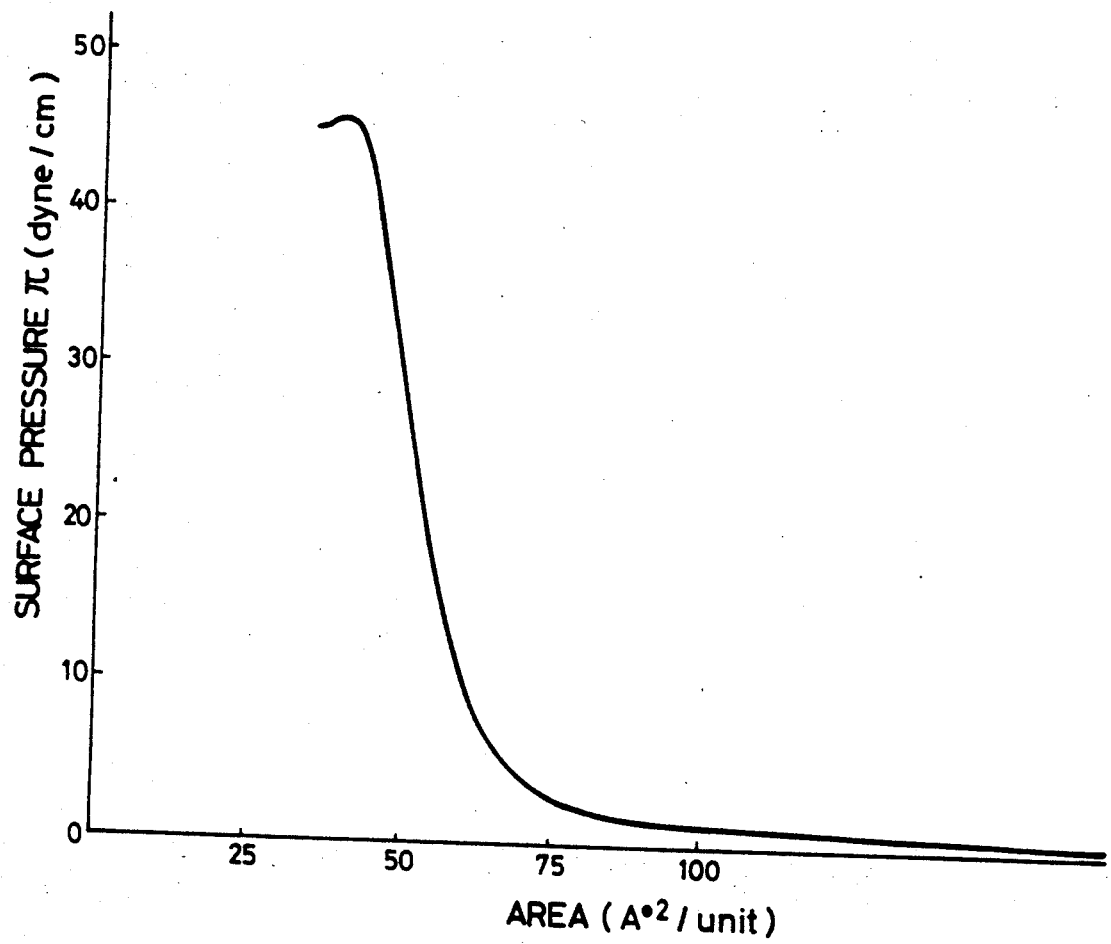
FIG. 9 indicates the relation between the surface pressure and the area per repeating unit of the high polymer obtained in Example 5.

In the same manner as in Example 2, the relation between the surface pressure and the area per repeating unit was measured, with the result being shown in FIG. 9.

The collapse pressure was as high as 45 dyne/cm, and a good condensed film could be formed. The limiting area was 60 Å$^2$/unit.

Further it was also confirmed that by maintaining the surface pressure at 25 dyne/cm the film of Y type can be built up on a glass substrate at a dipping speed of 10 mm/min. by LB technique.

According the present invention, there is to made feasible the film formation by the Langmuir-Blodgett technique, by modifying the high polymers which are inherently difficult to be formed into film according to the LB technique, and to provide high polymer films which have a thickness hitherto never obtained easily such as in 10,000 Å, if required 10–1000 Å, by partially or completely cyclizing the component thereof, and which exhibit improved heat resistance, chemical resistance and mechanical characteristics.

While the invention has been described in detail and with reference to specific embodiments thereof, it will be apparent to one skilled in the art that various changes and modifications can be made therein without departing from the spirit and scope thereof.

What is claimed is:

1. A built-up film formed by a Langmuir-Blodgett technique from a polymer which consists essentially of:
   (i) a skeleton of linear repeating units, wherein each of said linear repeating units are composed of a first organic group $R_1$ and a second organic group $R_2$, each of $R_1$ and $R_2$ being at least divalent and having at least two carbon atoms, $R_1$ and $R_2$ being connected with each other by a divalent bonding group formed by reaction of an acidic group containing a heteroatom and a basic group containing a heteroatom, and
   (ii) at least one group selected from hydrocarbon-containing groups $R_3$ and $R_4$ and bonded to the linear repeating units by covalent bonding, wherein each of $R_3$ and $R_4$ is independently a hydrocarbon-containing group of 10 to 30 carbon atoms which may contain substituent groups, with the proviso that when any one of the groups selected from $R_3$ and $R_4$ has 10 or 11 carbon atoms, then said group selected from $R_3$ and $R_4$ and having 10 or 11 carbon atoms must contain fluorine as said substituent groups.

2. A built-up film according to claim 1, wherein the average molecular weight of said polymer is in the range of 2,000 to 300,000.

3. A built-up film according to claim 1, wherein at least one of the groups $R_1$ and $R_2$ is a benzenoid group having at least 6 carbon atoms.

4. A built-up film according to claim 1, wherein both of the groups $R_3$ and $R_4$ are bonded to the same repeating unit.

5. A built-up film according to claim 1, wherein each of the groups $R_3$ and $R_4$ has 16 to 22 carbon atoms.

* * * * *

UNITED STATES PATENT AND TRADEMARK OFFICE
CERTIFICATE OF CORRECTION

PATENT NO. : 4,988,570
DATED : January 29, 1991
INVENTOR(S) : Masakazu UEKITA

It is certified that error appears in the above-identified patent and that said Letters Patent is hereby corrected as shown below:

On the cover page, Item [75], "Masakazu Ueikita" should read -- Masakazu Uekita --.

On the cover page, after Item [22], the following should appear:

-- [30]    Foreign Application Priority Data
    Sep. 11, 1985 [JP]   Japan ................ 60-202191 --.

Signed and Sealed this

Second Day of March, 1993

Attest:

STEPHEN G. KUNIN

*Attesting Officer*    *Acting Commissioner of Patents and Trademarks*